United States Patent [19]

Mercier

[11] 3,956,135

[45] May 11, 1976

[54] CENTRIFUGAL DRIER WITH PURGING DEVICE

[75] Inventor: Andre Mercier, La Madeleine, France

[73] Assignee: Fives-Cail Babcock, Paris, France

[22] Filed: Oct. 2, 1974

[21] Appl. No.: 511,359

[30] Foreign Application Priority Data

Oct. 2, 1973 France .............................. 73.35121

[52] U.S. Cl. ................................ 210/377; 210/378; 34/58

[51] Int. Cl.$^{2}$ .......................................... B01D 33/00

[58] Field of Search ................. 34/9, 58; 233/1 B, 2, 233/14 R; 210/213, 214, 216, 377, 215, 378

[56] References Cited

UNITED STATES PATENTS

| | | | |
|---|---|---|---|
| 2,779,473 | 1/1957 | Van Wezel | 210/213 |
| 3,011,647 | 12/1961 | Elsken | 210/377 |
| 3,366,245 | 1/1968 | Mercier | 233/2 |

FOREIGN PATENTS OR APPLICATIONS

| | | | |
|---|---|---|---|
| 866,853 | 5/1961 | United Kingdom | 210/377 |

*Primary Examiner*—Charles N. Hart
*Assistant Examiner*—Ernest G. Therkorn
*Attorney, Agent, or Firm*—Kurt Kelman

[57] ABSTRACT

A centrifugal drier comprises a rotary closure member mounted in the rotary drier basket and closing off the lower part of the interior basket chamber. Purging means is mounted on the periphery of the closure member and includes an annular element coaxial with the basket and having an exterior conical surface parallel to the conical wall of the basket. The exterior surface of the annular element is at a small distance from the screen and defines an annular ejection chamber open towards the basket wall. The annular element defines an annular inlet chamber open towards the rotary axis of the basket, a narrow passage connects the inlet chamber with the ejection chamber, and at least one fixed spray nozzle delivers a purging liquid to the annular inlet chamber.

11 Claims, 4 Drawing Figures

FIG.1
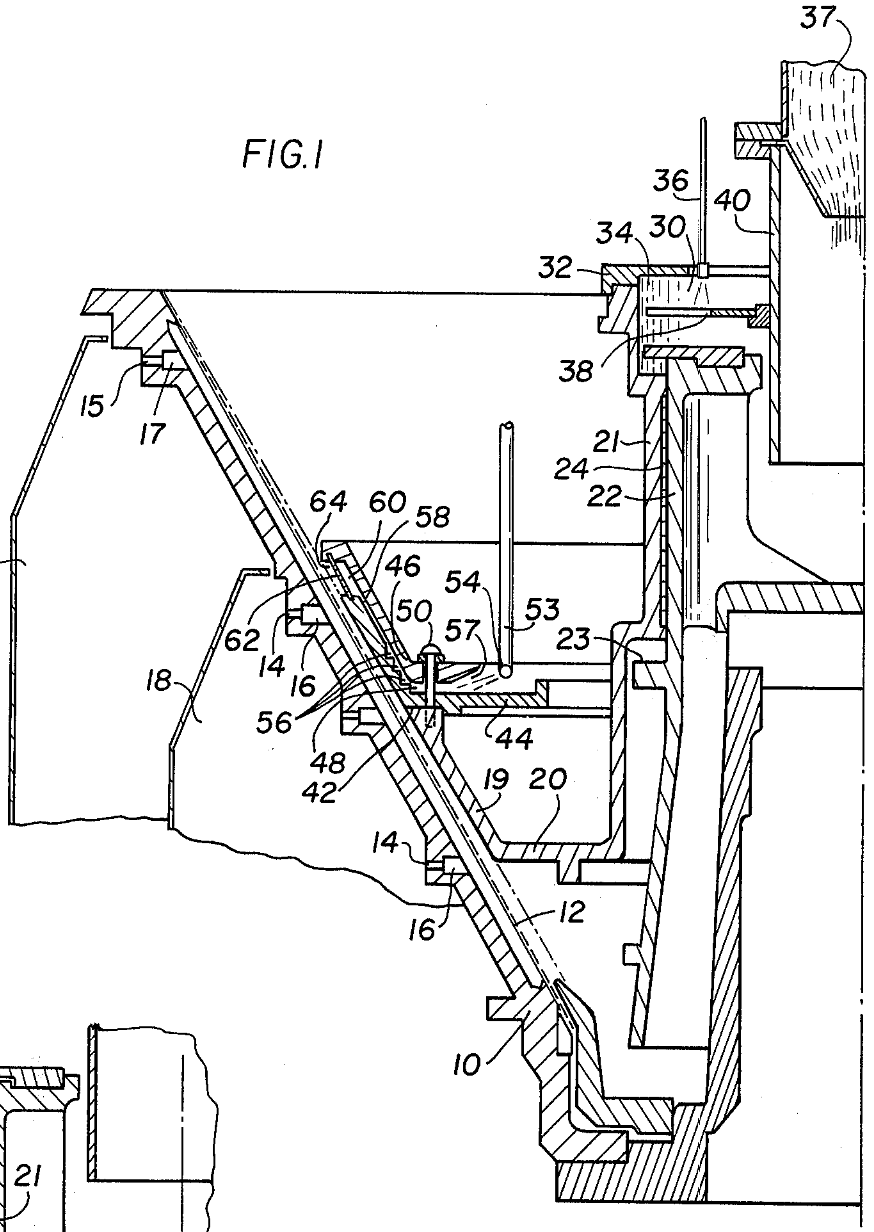
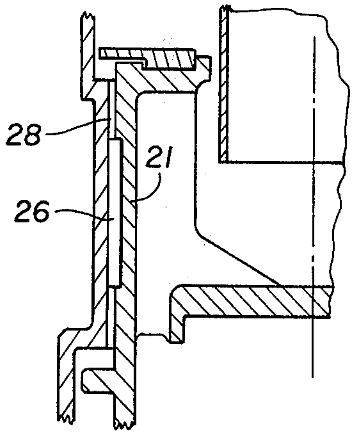
FIG.2

FIG.3
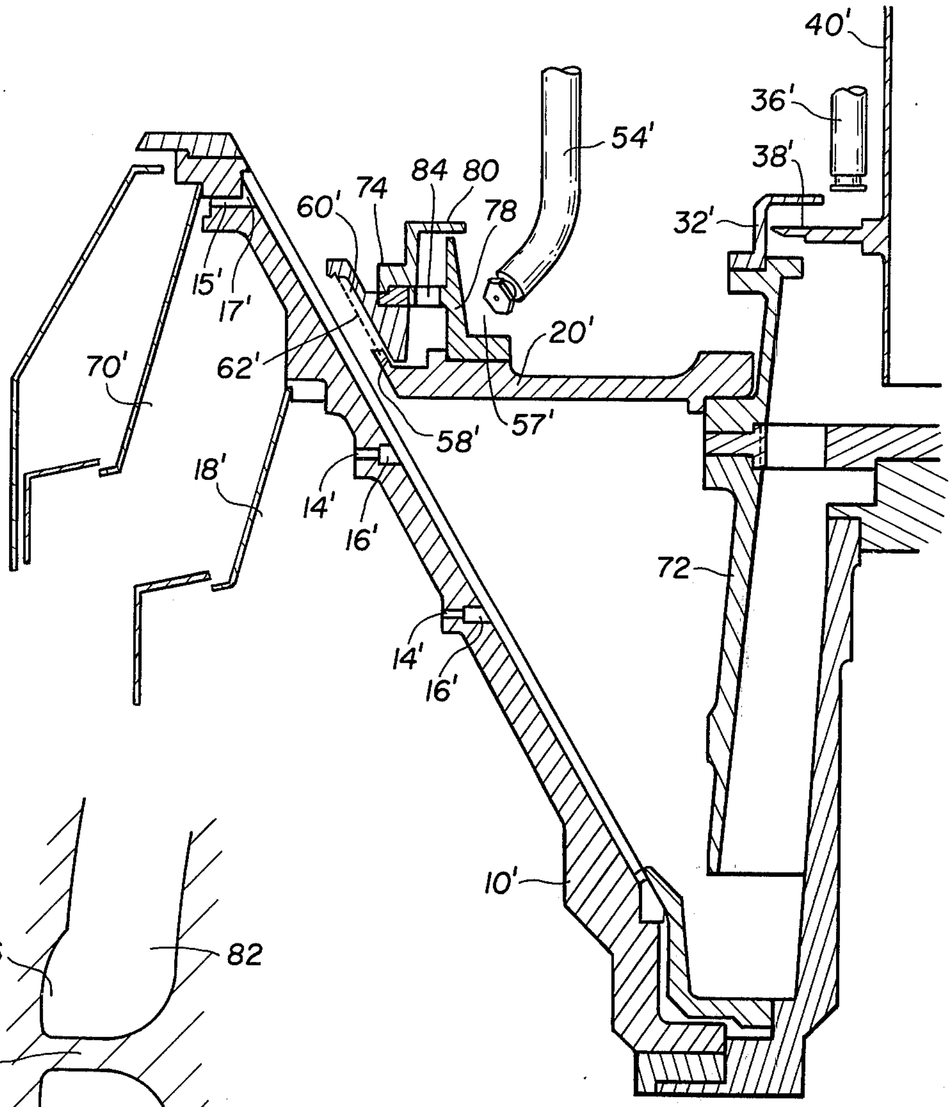
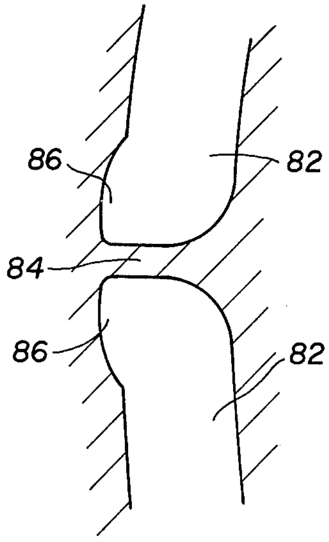
FIG.4

CENTRIFUGAL DRIER WITH PURGING DEVICE

The present invention relates to improvements in a centrifugral drier which comprises a basket having a conical wall and defining an interior chamber having a lower part, the baslet being rotatable about a vertical axis, and a conical screen disposed on the conical wall, a layer of solid particles being centrifugally deposited on the conical screen upon rotation of the basket, and more particularly to means for purging the solid material on the screen after a first drying phase.

When such driers are used in sugar refining, for instance, the purging of the sugar layer on the basket screen in the interior basket chamber is effectuated by spraying a suitable liquid, such as very hot water, on the layer of sugar to eliminate by vigorous washing the film of sirup remaining on the sugar crystals after the first drying phase. When this purging operation is carried out in a continuously rotating conical drying basket, the purging liquid is entrained towards the upper rim of the basket by the layer of air which is swirled upwards by the rotating basket. This upward entrainment is further increased by the inevitable difference of speed between the purging liquid and the layer of solid particles whereon it is projected. This results in a dispersion of the purging liquid, which is damaging to the drying of the particles and their subsequent purging. In addition, a portion of the purging liquid is projected into the chamber receiving the dried material and acts damagingly thereon.

In an effort to overcome these disadvantages, it has been proposed to place into the interior chamber of the rotary basket one or more fixed or rotary closing discs extending perpendicularly to the rotary axis of the basket, the purging liquid being introduced into the closed spaced delimited by the disc or discs. These known arrangements do not prevent the dispersion of the purging liquid by the swirling air in the rotating basket. Also, when the discs rotate at the same speed as the basket, the purging means is also rotary, and an even distribution of the purging liquid around the entire basket is not assured.

In the drying of suspensions of crystals from which the mother liquor is to be removed and which must be thoroughly washed to obtain a product of the greatest possible purity, conventional centrifugal driers do not permit the total separation of the mother liquid, or the poor sirup, from the purged product, or the rich sirup composed primarily of the remelted crystals which have been subjected to purging because the purging zone is not clearly delimited.

It is the primary object of this invention to provide a centrifugal drier of the indicated type wherein the purging or washing zone is narrow and precisely delimited, and the purging or washing liquid is uniformly distributed in this zone.

The above and other objects are accomplished according to the invention with a rotary closure member mounted in the interior basket chamber and closing off the lower part of the interior basket chamber. The purging means is mounted on the periphery of the rotary closure member and includes an annular element coaxial with the basket and having an exterior conical surface substantially parallel to the conical wall of the basket, the exterior surface of the annular element being at a small distance from the screen and defining an annular ejection chamber open towards the basket wall. The annular element defines an annular inlet chamber open towards the rotary axis of the basket. A narrow passage connects the inlet chamber with the ejection chamber and at least one fixed spray nozzle delivers a purging liquid to the annular inlet chamber. The passage is sufficiently narrow in relation to the output of purging liquid by the nozzle or nozzles that it always remains filled with liquid so that no air can enter the ejection chamber and a uniform liquid feed is assured about the entire periphery of the annular ejection chamber.

The above objects, advantages and features of the present invention will become more apparent from the following detailed description of now preferred embodiments thereof, taken in conjunction with the accompanying drawing wherein FIG. 1 is a vertical section of one half of a centrifugal drier according to this invention, the other half being symmetrically identical therewith;

FIG. 2 is a sectional view showing a modified mounting for the closure member;

FIG. 3 is a sectional view identical to that of FIG. 1 but showing another embodiment; and FIG. 4 shows an enlarged top view of a detail of the drier of FIG. 3.

Like elements functioning in a like manner are designated by the same reference numerals in FIGS. 1 and 3, except that the numerals are primed in FIG. 3, thus obviating some redundancy in the description of the two embodiments.

Referring now to the drawing, the generally conventional centrifugal drier is shown to comprise rotary basket 10 having a conical wall and defining an interior chamber having a lower part, the basket being rotatable about a vertical axis in the interior of a closed vessel. Conical filter screen 12 is disposed on the conical basket wall and a layer of solid material is centrifugally deposited on the screen upon rotation of the basket, the material being upwardly displaced on the screen by the centrifugal force. During drying, liquid passes through the screen and is thrown into a series of superposed annular grooves in the basket wall whence the liquid is evacuated through ports 14 into liquid collecting chamber 18 in the enclosing vessel.

The lower part of the interior chamber of the rotary basket is closed off liquid-tightly by closure member 20 which is glidingly mounted by means of sleeve 21 on cylindrical bearing 22 which is affixed to the rotary hub of the basket. The bearing has annular abutment 23 for delimiting the axial gliding movement of the closure member and bushing 24 is interposed between sleeve 21 and bearing 22 to provide a guide for the gliding movement, the bushing being made of a synthetic resin of great chemical inertness, such as Teflon.

The closure member has a conical periphery 19 extending substantially parallel to the conical wall of basket 10 and screen 12. In operation, this conical closure member part rests on the layer of dried solid material deposited centrifugally on the screen, being pressed down by its own weight and the suction produced in the lower basket chamber part by centrifugal displacement of the air therein.

In the embodiment of FIG. 1, the closure member is entrained for rotation with the basket by the frictional forces between the layer of solid particles on the screen and conical peripheral part 19.

However, as shown in the modification of FIG. 2, it is also possible to entrain closure member 20 positively for rotation by means of key 26 gliding in an axially extending groove 28 in sleeve 21 so that the closure member is keyed to the basket hub for rotation therewith.

A solid-liquid mixture 37 to be dried is fed to the centrifugal drier through hollow feed column 40 extending coaxially into the interior basket chamber to deliver the mixture through bearing 22 into the lower part of the basket chamber. The feed column has an air-tight joint at the top thereof to prevent air from entering into the basket chamber with the mixture to be dried. The solid phase of the mixture, i.e. the sugar if massecuite is fed to the drier, is centrifugally deposited on the conical screen 12 upon rotation of the basket about its vertical axis and forms a layer of the solid material, i.e. sugar crystals, on the screen, this solid material layer moving upwardly along the screen by centrifugal action while the mother liquor passes through the screen and is evacuated through grooves 16 and ports 14.

The upper part of closure member sleeve 21 and bearing 22 define annular cavity 30 surrounding the feed column, the periphery of the cavity being fluid-tightly closed off by flange 32, with a fluid-tight gasket being interposed between the rim of sleeve 21 and flange 32. This cavity contains annular body 34 of a liquid of the same type as that used for purging the solid material on the screen, i.e. a liquid capable of dissolving fines or projections of the solid material which could otherwise interfere with the movement of the closure member. Disc 38 is affixed to feed column 40 and the rim of the disc is immersed in liquid body 34 which is centrifugally pressed against the periphery of cavity 30. The body of liquid and the disc constitute a hydraulic joint between the feed column and the closure member, thus prevent air to enter into the lower part of the basket chamber below the closure member. Liquid delivery conduit 36 feeds the necessary amount of liquid into cavity 30 to maintain the hydraulic joint in operation and to lubricate the rotary closure member.

Upper rim 42 of closure member 19, 20 forms the periphery of the closure member and carries the purging means of the present invention. This purging means includes a twopart annular element coaxial with basket 10 and comprised of a first frusto-conical ring 46 having an exterior conical surface substantially parallel to the conical wall of the basket, and a second frusto-conical ring 44 having a frusto-conical portion surrounding the first frusto-conical ring, the first ring being telescoped into the second ring and extending therebeyond so that the exterior surface of the first ring is at a small distance from screen 12 and defines annular ejection chamber 60 open towards the basket wall. Second ring 44 has a series of parallel projections or teeth 48 maintaining the two rings at a slight spacing 58 from each other. The two rings are assembled by means of bolts 50 which also mount the rings on peripheral rim 42 of the closure member. The second ring 44 is so spaced from screen 12 that, during drying, it is in contact with, or at a slight distance from, the layer of solid material deposited on the screen by centrifugal force.

The two rings have respective inwardly extending annular collars extending in planes perpendicular to the rotary axis of the drier and defining therebetween annular inlet chamber 57 open towards the rotary axis of the basket. Spacing 58 between the frusto-conical portions of the rings forms a narrow passage connecting inlet chamber 57 with ejection chamber 60. One or several fixed spray nozzles 54 extends towards the inlet chamber to deliver a purging liquid thereto, the purging liquid being fed to the nozzle by conduit 53. The purging liquid delivered into inlet chamber 57 through nozzles 54 is entrained centrifugally, passing through circular channels 56 defined by projections 48 and narrow passage 58 into ejection chamber 60. The circular channels regulate the thickness of the purging liquid film entering the ejection chamber, and the purging liquid is thrown from the ejection chamber towards screen 12, screen 62 being disposed over the ejection chamber and extending substantially parallel to the basket wall. The screen consists of a finely perforated metal sheet in the manner of a shower head.

The purging liquid distributed through screen 62 is thrown through narrow space 64 separating the layer of solid material on screen 12 from the purging means to impinge upon the solid material and purge the same. In passing through the screen, the purging liquid is forced to assume a tangential speed approximating that of the solid material to be purged or washed. Any air in narrow space 64 also rotates at the same speed but air currents are prevented because no air can enter into the interior of the basket chamber through hydraulic joint 34, 38. Thus, the purging liquid will be deposited on the solid material layer without impact and will not bounce off it, no appreciable dispersion due to air movements taking place.

The purged or washed product, or the rich sirup, is filtered through screen 12 and moves along the conical wall of basket 10, the mother liquid being evacuated through grooves 16 and ports 14. As the washed product moves upwardly along the basket wall under the centrifugal force, it is collected in annular groove 17 disposed near the top rim of the basket and evacuated through ports 15 in the basket wall, the washed product being received in chamber 70 in the enclosing casing, which is separated from chamber 18 by an annular dividing wall.

In the embodiment of FIG. 3, closure member 20' is affixed to sleeve 72 which distributes the solid-liquid mixture fed through column 40' at the bottom of rotary basket 10', the distributing sleeve being mounted for rotation on and with the rotary hub of the basket. In this embodiment, the purging means mounted on the periphery of rotary closure member 20' comprises a first annular ring 78 which flares upwardly and exteriorly delimits annular inlet chamber 57', and a second, downwardly flaring ring 74 concentrically surrounding the first ring and spaced therefrom to define an annular space therebetween. The first ring is mounted on closure member 20' and the second ring is supported on the first ring. The second ring consists of two parts and the lower ring part has a frusto-conical exterior surface defining ejection chamber 62'. Narrow passage 58' between the lower ring part and annular closure member 20' communicates with the annular space between rings 74 and 78, which space, in turn, is in communication with inlet chamber 57' through a slot between the upper rim of ring 78 and collar 80 extending radially inwardly from the upper rim of ring 74. Ring 74 is carried on ring 78 by an annular collar on which the two parts of ring 74 are mounted, the collar being pierced by longated ports 82 so as to provide communication between the lower and upper portion of the annular space between the two rings. The annular collar has radial support arms 84 between the elongated ports, as best seen in FIG. 4. The outer walls of the ports have recesses 86 at the ends thereof adjacent support arms 84. At the level of the upper face of the annular supporting collar, the rim of ports 82 between the recesses follows the contour of the interior face of ring 74 and substantially coincides with the interior rim of this ring at this level, with the rim of the recesses being cut back. On the other hand, at the level of the lower face of the supporting collar, the rim of the ports between the recesses projects in respect to the interior face of ring 74 and the bottom of the recesses is substantially in alignment with the interior rim of this ring at this level.

As can be seen in FIG. 3, the inner faces of the two parts of ring 74 are not in alignment with each other, the inner face of the lower ring part being recessed to produce an abrupt increase in the diameter.

The purging or washing liquid projected by nozzles 54' against the upwardly flaring wall of inlet chamber 57' is set in rotation when the closure member rotates with the basket and, under the centrifugal force exerted thereof, the purging liquid spreads over this flaring wall and glides upwardly thereon to its upper rim whence it is ejected through the slot between the upper rim and collar 80 in the form of a liquid sheet against the inner face of ring 74, running down in a continuous streaks along the downwardly flaring wall of the ring. At the level of the collar supporting ring 74, the liquid streams in alignment with radical supporting arms 84 are directed into recesses 86 of ports 82. At the ends of the recesses, these liquid streams are centrifugally forced into the empty spaces beneath the supporting arms and reconstitute a continuous curtain of liquid flowing over the inner face of ring 74. This film of liquid then passes into ejection chamber 60' without encountering any other obstacles, and a uniform feeding of purging liquid is thus assured over the entire periphery of the ejection chamber, resulting in uniform washing or purging of the dried product on the screen.

I claim:

1. In a centrifugal drier which comprises a basket having a conical wall and defining an interior chamber having a lower part, the basket being rotatable about a vertical axis, a conical screen disposed on the conical basket wall, a conduit for feeding a solid-liquid mixture to the basket chamber, a layer of solid material being centrifugally deposited on the conical screen upon rotation of the basket, and a means for purging the layer of solid material, the improvement of 1. a rotary closure member mounted in the interior basket chamber and closing off the lower part of the interior basket chamber,
2. a fluid-tight joint between the feeding conduit and the closure member, and
3. the purging means being mounted on the periphery of the rotary closure member and including
   a. an annular element coaxial with the basket and having an exterior conical surface substantially parallel to the conical wall of the basket, the exterior surface of the annular element being at a small distance from the screen and defining an annular ejection chamber open towards the basket wall,
   b. the annular element defining an annular inlet chamber open towards the rotary axis of the basket,
   c. a narrow circular passage connecting the inlet chamber with the ejection chamber, and
   d. at least one fixed spray nozzle delivering a purging liquid to the annular inlet chamber.

2. In the centrifugal drier of claim 1, the annular element comprising a first, upwardly flaring ring exteriorly delimiting the annular inlet chamber, a second, downwardly flaring ring concentrically surrounding the first ring and spaced therefrom to define an annular space therebetween, the annular space being in communication with the inlet chamber and with the narrow passage, respectively.

3. In the centrifugal drier of claim 2, arms mounted in a radial plane on the first ring and supporting the second ring, and port means between the arms.

4. In the centrifugal drier of claim 3, the diameter of the interior surface of the second ring abruptly increasing in the radial plane of the supporting arms.

5. In the centrifugal drier of claim 3, the second ring consisting of two parts, an annular radial support collar extending from the first ring between the two parts of the second ring to support the same, the collar defining elongated ports between radial support arms extending between the ports, the ports having a recessed wall portion adjacent the support arms, each wall portion having an upper and a lower rim, the upper rims of the port wall portions following the contour of the interior surface of the second ring between the recessed wall portions, and the lower rims of the wall portions projecting from the interior surface of the second ring between the recessed wall portions.

6. In the centrifugal drier of claim 1, the annular element consisting of two frusto-conical rings concentric with each other to define the narrow passage therebetween.

7. In the centrifugal drier of claim 1, a cylindrical hub mounted coaxially in the basket for rotation therewith, and the rotary closure member being mounted glidingly on the hub.

8. In the centrifugal drier of claim 7, wherein the closure member is keyed to the hub and is entrained for rotation by rotation of the basket.

9. In the centrifugal drier of claim 1, the closure member being mounted for rotation on, and with, the basket.

10. In the centrifugal drier of claim 1, the joint being for feeding a solid-liquid mixture to the basket chamber and a hydraulic joint between the feeding conduit and the closure member, the joint being constituted by an annular cavity defined by a portion of the closure member surrounding the feeding conduit and a disc affixed to the conduit, the cavity holding an annular body of liquid and the rim of the disc being immersed in the annular body of liquid.

11. In the centrifugal drier of claim 1, a screen disposed over the ejection chamber and extending substantially parallel to the basket wall, the screen facing the wall.

* * * * *

UNITED STATES PATENT OFFICE

CERTIFICATE OF CORRECTION

PATENT NO. : 3,956,135

DATED : May 11, 1976

INVENTOR(S) : Andre Mercier

It is certified that error appears in the above-identified patent and that said Letters Patent are hereby corrected as shown below:

Claim 10, cancel line 2; line 3, cancel "and" (first occurrence)

Signed and Sealed this

First Day of March 1977

[SEAL]

*Attest:*

RUTH C. MASON
*Attesting Officer*

C. MARSHALL DANN
*Commissioner of Patents and Trademarks*